United States Patent [19]
Hoffmeyer

[11] 3,755,998
[45] Sept. 4, 1973

[54] ADJUSTABLE LAWN MOWER ROLLER SUPPORT

[75] Inventor: Knud H. Hoffmeyer, Racine, Wis.

[73] Assignee: Jacobsen Manufacturing Company, Racine, Wis.

[22] Filed: July 3, 1972

[21] Appl. No.: 268,546

[52] U.S. Cl.......................... 56/255, 56/249, 280/43
[51] Int. Cl........................................... A01d 55/18
[58] Field of Search................... 56/255, 15.8, 13.7, 56/13.6, 11.6, 17.5, 17.1, 17.2; 280/43

[56] References Cited
UNITED STATES PATENTS

| | | | |
|---|---|---|---|
| 1,399,601 | 12/1921 | Boll | 56/249 |
| 3,483,684 | 12/1969 | Price | 56/13.6 |
| 3,537,720 | 11/1970 | Irgens | 280/43 |
| 3,550,364 | 12/1970 | Musgrave | 56/15.8 |
| 3,686,840 | 8/1972 | Root | 56/15.8 |
| 3,706,186 | 12/1972 | Hurlburt et al. | 56/15.8 |

Primary Examiner—Russell R. Kinsey
Attorney—Arthur J. Hansmann

[57] ABSTRACT

An adjustable lawn mower roller support having a plurality of spaced-apart rollers rotatably mounted on a shaft supported on the mower from a plurality of links. The links are pivotally connected to additional links which in turn are supported on a rotatable shaft on the lawn mower. A lever is connected to the shaft, and a quadrant secures the selected pivoted positions of the lever and the shaft so that the links and the roller can be vertically adjustably positioned.

8 Claims, 2 Drawing Figures

PATENTED SEP 4 1973 3,755,998

ADJUSTABLE LAWN MOWER ROLLER SUPPORT

This invention relates to an adjustable lawn mower roller support and, more particularly, it pertains to a large rotary type lawn mower which has a plurality of spaced-apart rollers supported on the mower for selective setting on the elevation of the mower.

BACKGROUND OF THE INVENTION

Adjustable roller supports are well known in the lawn mower art. These supports are commonly formed with links pivoted together for supporting a ground-engaging roller so that the roller can be moved up and down for adjusting the elevation of the mower. Further, these prior art adjustments commonly include a lever and a quadrant for pivoting the adjusting links in establishing the selected elevated positions. However, the provision and arrangement of the prior art roller adjustments do not commonly include consideration of the provision of a roller arrangement where a plurality of rollers are spaced along the width of the mower which may be of a size spanning at least several feet and having three or more cutters adjacent each other. This type of lawn mower and roller support presents special problems regarding the adjustment of the roller, and these problems include the provision of a sturdy roller support, a roller support which is accurate in its end-to-end position so that the same elevation exists at opposite ends of the long roller support, and the provision of a roller support which can be readily and easily placed in the adjusted position. Accordingly, the present invention is directed at overcoming these problems.

Still further, the present invention provides a roller support wherein the roller moves in a direction to position the roller closer to the center of the mower when the roller is in its maximum height adjustment position, rather than having the roller positioned spaced from the mower a distance where the forces on the roller will be such that the support must be unduly heavy or cumbersome with regard to its arrangement and its facility for adjustment. That is, the roller support of this invention retains the roller immediately adjacent the mower itself, rather than having the roller pivot or move laterally away from the mower when the height adjustment is being made.

Other objects and advantages of this invention include a provision of an improved adjustable roller support, and wherein the support is easily manufactured and operated, and the operator can readily determine the elevated position he has selected, and that position is securely retained. Further, only a minimum of force is required to adjust the roller against the weight of the mower, and thus the operator can readily accomplish the adjustment, and the adjusting parts need not be large parts. That is, the links forming the adjustable support are arranged to provide a mechanical advantage in making the adjustment against the weight of the lawn mower.

Other objects and advantages will become apparent upon reading the following description in light of the accompanying drawings.

DETAILED DESCRIPTION OF THE PREFERRED EMBODIMENT

Figure 1:
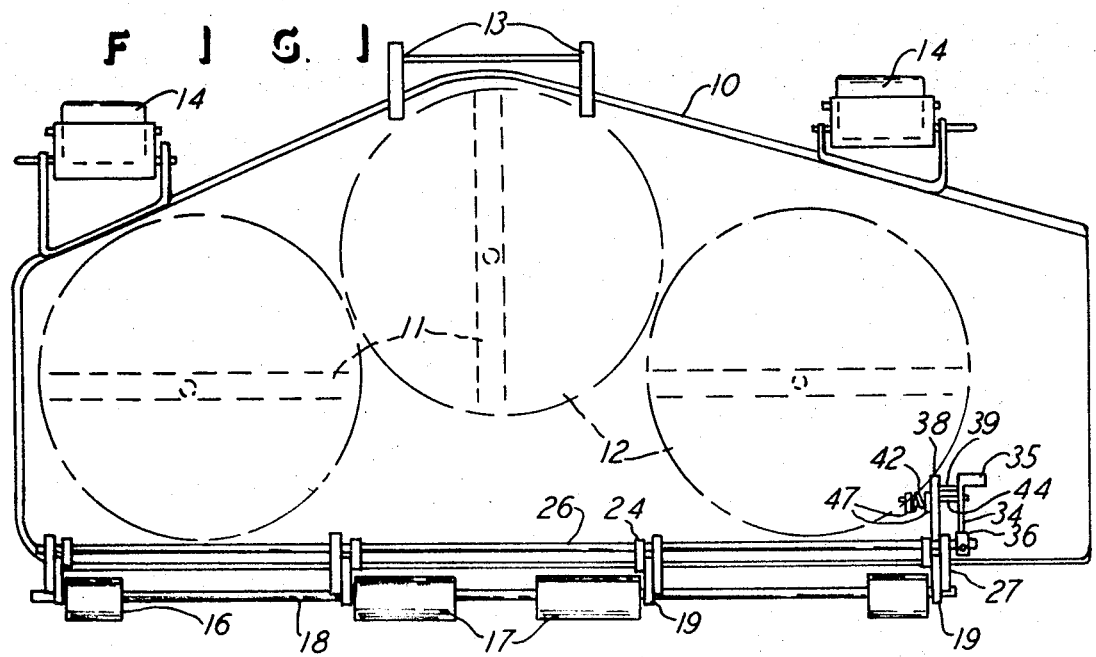
FIG. 1 is a top plan view of a mower having an adjustable roller support of this invention.

A large lawn mower is shown to include a housing 10 and three rotary cutters 11 which are shown in dotted lines and which scribe the circles 12 indicated by dot-dash lines. The mower 10 has hitching plates 13 at the front end thereof, and the plates 13 are available for attaching the mower to a tractor which is not shown, but the attachment would be in a conventional manner. Front rollers 14 are supported on the mower for engaging the ground, particularly in the event that the hitch means 13 is supporting the front end of the mower 10 at an elevation so that the rollers 14 will contact the ground, and the rollers 14 are essentially anti-scalping rollers. Rear rollers 16 and 17 are also rotatably supported on the mower 10 by means of a long shaft 18 extending substantially across the entire width of the mower which may be at least several feet wide. Thus, if the hitch means 13 is holding the forward end of the mower 10 upwardly from the ground, then the mower is riding on the ground by having the rear rollers 16 and 17 engage the ground, and this is the common position and function of the rollers mentioned.

The shaft 18 is vertically adjustably supported on the mower 10 for altering the elevation of the mower proper, and the adjustable support members are shown to be links. Thus, a first link 19 is connected to the shaft 18 to support the latter, and the link 19 is connected to the shaft 18 through the shaft end 21 and by a connecting nut 22. The link 19 extends upwardly and forwardly, relative to the direction of forward movement of the mower 10, and it terminates in an upper end 23 which is pivotly connected to a second link 24. The second link 24 is affixed to a shaft 26 which is rotatably supported on the mower 10, and such support may be through a member 27 which is affixed to the housing by means of the welding 28 or the like.

Figure 2:
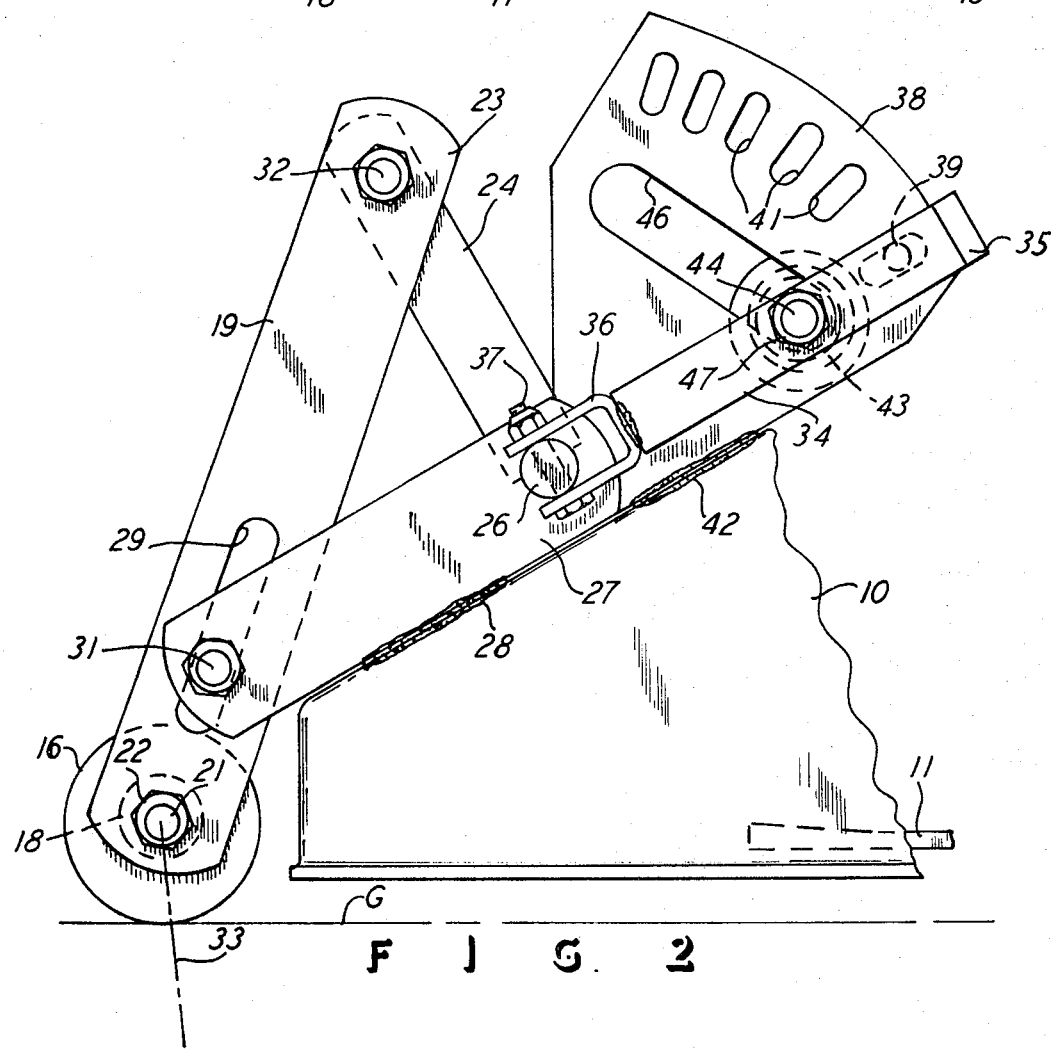
FIG. 2 is an enlarged side-elevational view of the adjustment support shown in FIG. 1.

FIG. 2 shows that the first link 19 and the member 27 have a slidable guiding connection therebetween accomplished by a longitudinal slot 29 in the first link 19 and a bolt 31 extending through the slot 29 and connecting to the member 27.

At this point, it should now be understood that the first link 19 is movable up and down, and its upper end 23 moves about an arc on the center of a connecting bolt 32 connecting the two links 19 and 24 and with the bolt 32 scribing the arc about the axis of the shaft 26. The lower end of the link 19 is restrained by the bolt 31, as the link 19 slides relative to the fixed bolt 31, and thus the axis of the rollers 16 and 17 and the axis of the shaft 18 move along the dot-dash line designated 33. That is, the direction of movement of the rollers 16 and 17, as the mower 10 is being elevated through the adjusting mechanism described, is toward the center of the mower 10, rather than away from the mower 10 in the lateral direction. Therefore, the adjustment can be easily accomplished with only a minimum adjusting force applied to the links described, and the roller does not extend away from the mower 10 in the lateral direction to occupy more space for the entire assembly. Of course the rollers 16 and 17 normally ride on the ground line G. Of course the bolt 31 holds the link 19 at the side of the member 27 while permitting the sliding described, and the weight of the mower 10 would be on the bolts 32 and 31.

The adjustment support described is arranged such that the length of the second link 24, or the distance between the axis of the shaft 26 and the axis of the bolt 32, is less than the distance between the axis of the shaft 26 and the axis of the bolt 31. Therefore, the arc scribed by the axis of the bolt 32 falls within the longer distance from the shaft 26 outwardly to the bolt 31, and the adjustment can be made and the movement is along the line 33, as described.

The member 27 thus serves to slidably guide the first link 19 and prevent the link from moving away from the mower 10, and the bolt 31, connecting the member 27 and the link 19, serves the purpose of preventing the link 19 from moving away from the mower 10. At the same time, the slot 29 is of a sufficient length to permit full up and down movement of the link 19 in the adjustment of the link 19, and the axis of the roller 17 will then follow the dot-dash line designated 33. In this arrangement, the arc scribed by the axis of the bolt 32 is closer toward the center of the mower than is the location of all points of sliding contact between the bolt 31 and the link 19. The link 24 extends upwardly from the shaft 26 and its length is less than the length of the link 19.

A lever 34 is connected to the shaft 26 by a U-shaped member 36 and a bolt 37 extends through the U-shaped member 36 and the shaft 26. Movement of the lever 34 in the plane transverse to the axis of the shaft 26 will induce rotation of the shaft 26 and consequent pivotal motion of the link 24 which moves with the shaft 26 as it is affixed thereto. The lever 34 has a handle 35, and the lever engages a plate 38 fixedly disposed adjacent the lever 34 and serving as a quadrant. The lever 34 has a pin 39 which can be selectively disposed in openings 41 in the plate 38 for selective pivotal positioning of the lever 34. The lever pin 39 extends from the lever and is insertable into the selected one of the holes 41, and the bolt 37 permits the pivotal motion of the lever 34 about the axis of the bolt 37 so that the lever can move toward and away from the plate 38 in selective positioning of the lever 34 along the plate 38. The plate 38 is shown affixed to the mower 10 by means of the weld 42.

A compression spring 43 is mounted on the lever 34 and serves to yieldingly urge the lever 34 toward the plate 38. The spring 43 is disposed on a pin or bolt 44 extending through the lever 34 and through a slot 46 in the plate 38. Two washers 47 are disposed at opposite ends of the spring 43 and are on the bolt 44 and the spring 43 abuts against the washers 47 to bear against the plate 38 and against the end of the bolt 44 and thereby urge the nut 47 on the bolt 44 toward the lever 34 and thus hold the lever toward the plate 38 so that the pin 39 will remain inserted in the selected opening 41 until intentionally removed therefrom.

Thus the plate 38 presents the plurality of holes 41 which are stations along the plate 38 affixed relative to the mower 10 and in which the lever 34 can be retained. Thus, the legs of the U-shaped piece 36 straddle the shaft 26 and permit the lever to be pivoted on the shaft 26 and about the axis of the bolt 37 for moving the pin 39 into and out of the openings 41 in the plate 38. When the lever 34 is pivoted to rotate the shaft 26, then there is identical pivotal motion of the link 24 and there is consequent up or down movement of the first link 19. In this arrangement, the lever 34 and the link 24 and the location of the sliding contact bolt 31 adjacent the roller 17 present a mechanical advantage in making the roller adjustment. The bolt 31 and slot 29 serve as a pin and slot connection, and the bolt 31 is the fulcrum point for the action of the first link 19 which is in the form of a lever with the axis of the bolt 32 and the axis of the shaft 18 serving as the end points of the lever action of link 19.

What is claimed is:

1. An adjustable lawn mower roller support for use with a lawn mower and a roller adjacent said lawn mower, said support comprising a first link connected with said roller and extending upwardly therefrom, a second link pivotally connected with the upper end of said first link, a lever assembly pivotally supported on said lawn mower and being connected to said second link for pivoting said second link to raise and lower said first link and said roller, and a guide member on said mower and operatively associated with said first link for slidably guiding said first link in the raising and lowering of said first link and for restraining said first link against movement away from said lawn mower to have said roller move up and down adjacent said lawn mower and not pivotally swing laterally away from said lawn mower during height adjusting.

2. The adjustable lawn mower roller support as claimed in claim 1, including a plurality of rollers spaced apart, a shaft of which said rollers are mounted, a plurality of said first links attached to said shaft, and a plurality of said second links pivotally connected to said first links.

3. The adjustable lawn mower roller support as claimed in claim 2, wherein said lever assembly includes a second shaft, rotatably mounted on said mower, and a lever, mounted on said second shaft, for rotating said second shaft and for securing said second shaft in selected rotated positions, said second link being affixed to said second shaft to pivot therewith, and a plurality of stations affixed on said lawn mower and being engagable with said lever for securing said lever in selected pivoted positions.

4. The adjustable lawn mower roller support as claimed in claim 1, wherein said lever assembly includes a shaft, rotatably mounted on said mower, and a lever, mounted on said shaft, for rotating said shaft and for securing said shaft in selected rotated positions, said second link being affixed to said shaft to pivot therewith, and a plurality of stations affixed on said lawn mower and being engagable with said lever for securing said lever in selected pivoted positions.

5. The adjustable lawn mower roller support as claimed in claim 4, wherein said second link and said guide member are arranged relative to said first link to have the arc along which the pivot movement of the connection point between the two said links be disposed closer toward the center of said lawn mower as compared to the location of the sliding contact between said first link and said guide member.

6. The adjustable lawn mower roller support as claimed in claim 4, wherein said second link extends upwardly from said shaft and has its upper end pivotally connected with said first link, and the length of said second link being less than the length of said first link and less than the distance between said shaft and all points of sliding contact between said first link and said guide member.

7. The adjustable lawn mower roller support as claimed in claim 4, wherein said lever includes a U- shaped member straddling said shaft, and a bolt extending through said U-shaped member and said shaft for securing said lever to said shaft and providing the pivot axis for said lever on said shaft.

8. The adjustable lawn mower roller support as claimed in claim 1, wherein said guide member and said first link are operatively connected through a pin and slot connection therebetween.

* * * * *

UNITED STATES PATENT OFFICE
CERTIFICATE OF CORRECTION

Patent No. 3,755,998  Dated September 4, 1973

Inventor(s) Knud H. Hoffmeyer

It is certified that error appears in the above-identified patent and that said Letters Patent are hereby corrected as shown below:

In Claim 2, line 3, change "of" to --on--.

Signed and sealed this 18th day of December 1973.

(SEAL)
Attest:

EDWARD M. FLETCHER, JR.
Attesting Officer

RENE D. TEGTMEYER
Acting Commissioner of Patents